United States Patent [19]

Tsao et al.

[11] Patent Number: 5,630,580
[45] Date of Patent: May 20, 1997

[54] FEED ROLL ASSEMBLY ADAPTED FOR DELIVERING SHEET OF PAPER IN A FAX MACHINE OR THE LIKE

[75] Inventors: Wei-Ming Tsao; Kung-Her Su, both of Taipei, Taiwan

[73] Assignee: Silitek Corporation, Taipei, Taiwan

[21] Appl. No.: 641,732

[22] Filed: May 2, 1996

[51] Int. Cl.⁶ ............................................. B65H 5/00
[52] U.S. Cl. .................... 271/10.13; 271/116; 271/314; 198/577
[58] Field of Search ............................ 271/10.13, 116, 271/264, 314; 198/577

[56] References Cited

U.S. PATENT DOCUMENTS

| | | | |
|---|---|---|---|
| 5,116,038 | 5/1992 | Kim | 271/116 |
| 5,141,217 | 8/1992 | Tsao et al. | 271/10.13 |
| 5,169,136 | 12/1992 | Yamagata et al. | 271/10.13 |

*Primary Examiner*—H. Grant Skaggs
*Attorney, Agent, or Firm*—Morton J. Rosenberg; David I. Klein

[57] ABSTRACT

A feed roll assembly which includes an axle installed in for example a fax machine and having a noncircular extension rod at one end, a roll fixedly mounted around the axle in the middle and turned by it to delivery inserted sheet of paper, a coupling wheel coupled to the non-circular extension rod of the axle and turned with it, the coupling wheel having an outward flange at one end and a plurality of wedge-like grooves spaced around the periphery adjacent to the outward flange, a transmission gear revolvably mounted around the non-circular extension rod of the axle, and a spring movably mounted around the coupling wheel and stopped between the transmission gear and the outward flange of the coupling wheel and having a rear end moved in an arched groove in the transmission gear and a front end moved relative to the radially spaced wedge-like grooves of the coupling wheel, wherein the spring is compressed and coupled to the coupling wheel when the transmission gear is rotated forwards, thereby causing the coupling wheel to be driven by the transmission gear to turn the axle.

2 Claims, 8 Drawing Sheets

5,630,580

FEED ROLL ASSEMBLY ADAPTED FOR DELIVERING SHEET OF PAPER IN A FAX MACHINE OR THE LIKE

BACKGROUND OF THE INVENTION

The present invention relates to a feed roll assembly adapted for use in a fax machine or the like and controlled to feed sheet of paper.

A variety of fax machines have been disclosed, and have appeared on the market. Regular fax machines commonly have a feed roll assembly driven to feed paper into the machine. FIG. 1 shows the feed roll assembly of a regular fax machine. As indicated, the feed roll assembly comprises an axle, a roll fixedly mounted around the axle in the middle, a transmission gear revolvably mounted around one end of the axle and coupled to a motor drive, a coupling wheel mounted around the axle adjacent to the transmission gear and turned with the axle, and a spring mounted around the coupling wheel and connected to the transmission gear. When the transmission gear is rotated forwards, the spring is compressed, causing the coupling wheel and the spring to be coupled together by means of a friction force, and therefore the coupling wheel is driven by the transmission gear to turn the axle. When the axle is rotated, the inserted sheet of paper is fed by the roll to the transmission roll inside the fax machine. The transmission roll is turned at a higher speed. When the sheet of paper is delivered forwards by the transmission roll, the spring is released from the coupling wheel to cut off power transmission between the transmission gear and the coupling wheel. Because the coupling between the spring and the coupling wheel is achieved by means of a friction force, the precision of the spring and the coupling wheel is critical. Therefore, the manufacturing cost of the feed roll assembly is expensive. Furthermore, in order to let inserted sheets of paper to be separately delivered one after another, the speed ratio between the roll of the axle and the transmission roll must be big enough. However, increasing the speed ratio between the roll of the axle and the transmission roll tends to cause the fed sheet of paper to be deviated from the course.

SUMMARY OF THE INVENTION

The present invention has been accomplished to provide a feed roll assembly which eliminates the aforesaid drawbacks. According to the preferred embodiment of the present invention, the feed roll assembly comprises an axle installed in for example a fax machine and having a non-circular extension rod at one end, a roll fixedly mounted around the axle in the middle and turned by it to delivery inserted sheet of paper, a coupling wheel coupled to the non-circular extension rod of the axle and turned with it, the coupling wheel having an outward flange at one end and a plurality of wedge-like grooves spaced around the periphery adjacent to the outward flange, a transmission gear revolvably mounted around the non-circular extension rod of the axle, and a spring movably mounted around the coupling wheel and stopped between the transmission gear and the outward flange of the coupling wheel and having a rear end moved in an arched groove in the transmission gear and a front end moved relative to the radially spaced wedge-like grooves of the coupling wheel, wherein the spring is compressed and coupled to the coupling wheel when the transmission gear is rotated forwards, thereby causing the coupling wheel to be driven by the transmission gear to turn the axle. Because the coupling between the spring and the coupling wheel is not achieved by means of a friction force, the precision of the spring and the coupling wheel is less critical, and therefore the manufacturing cost of the feed roll assembly is less expensive. Furthermore, because the rear end of the spring is disposed in the arched groove of the transmission gear, the coupling wheel will run idle when the rear end of the spring is moved in the arched groove before it is stopped at one end thereof. Therefore, the speed ratio between the roll of the axle and the transmission roll of the machine can be minimized to prevent deviation of the fed sheet of paper during its delivery.

DETAILED DESCRIPTION OF THE PREFERRED EMBODIMENT

Figure 1:
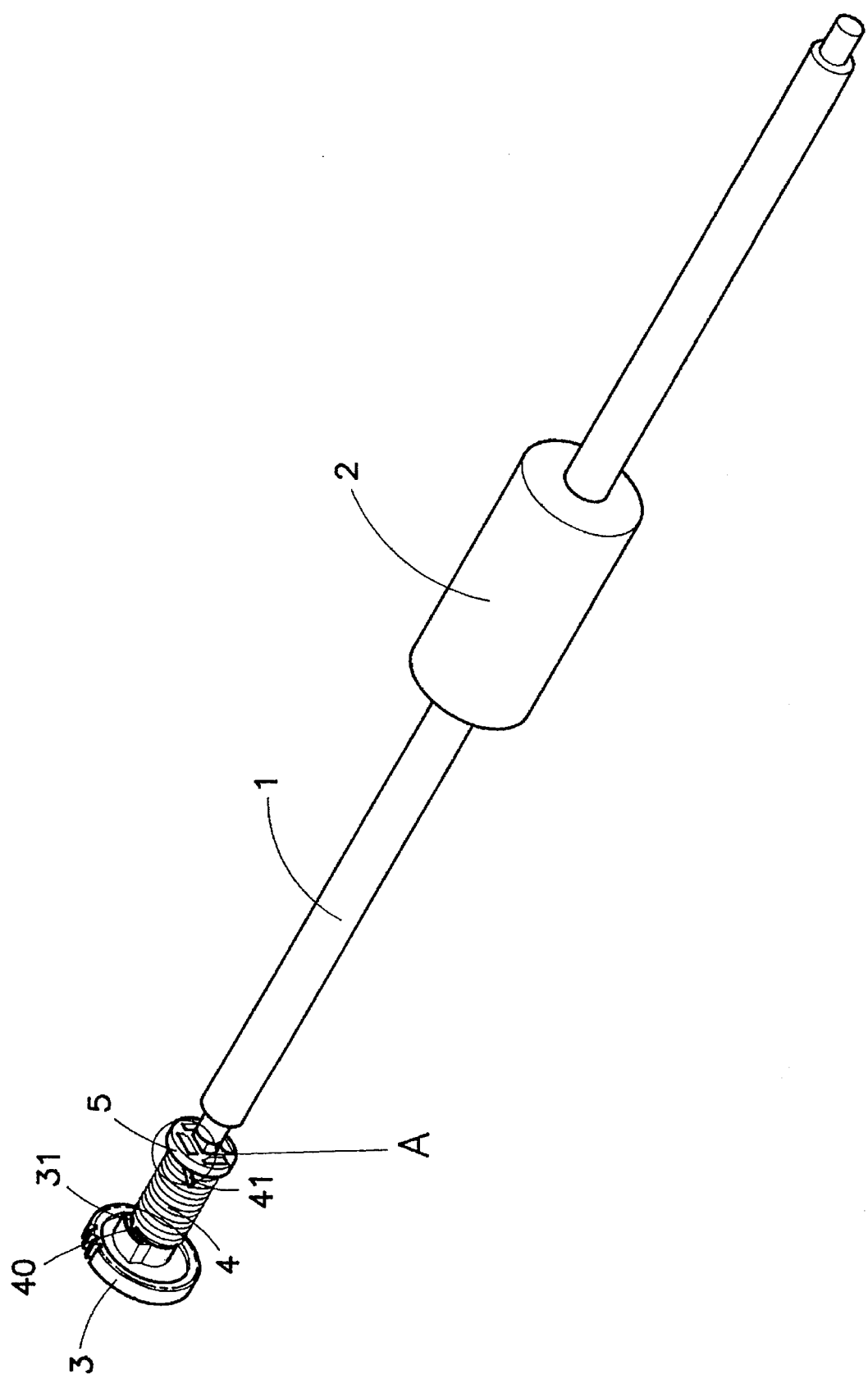
FIG. 1 shows a feed roll assembly according to the prior art.
Figure 1A:
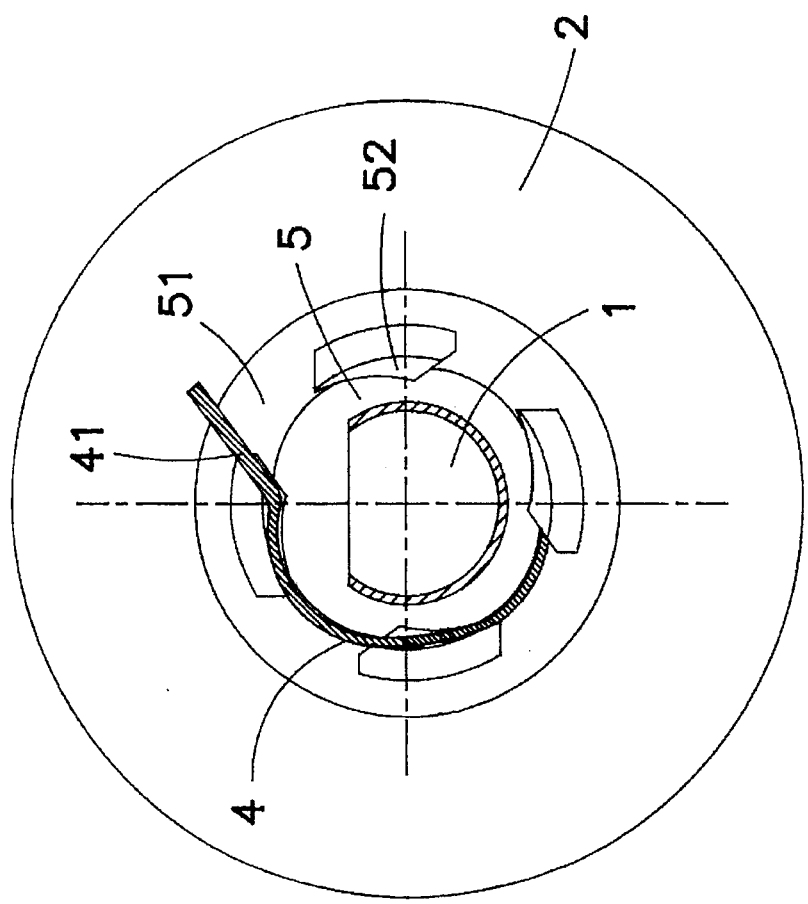
FIG. 1A is a sectional view in an enlarged scale of a part of FIG. 2.
Figure 2:
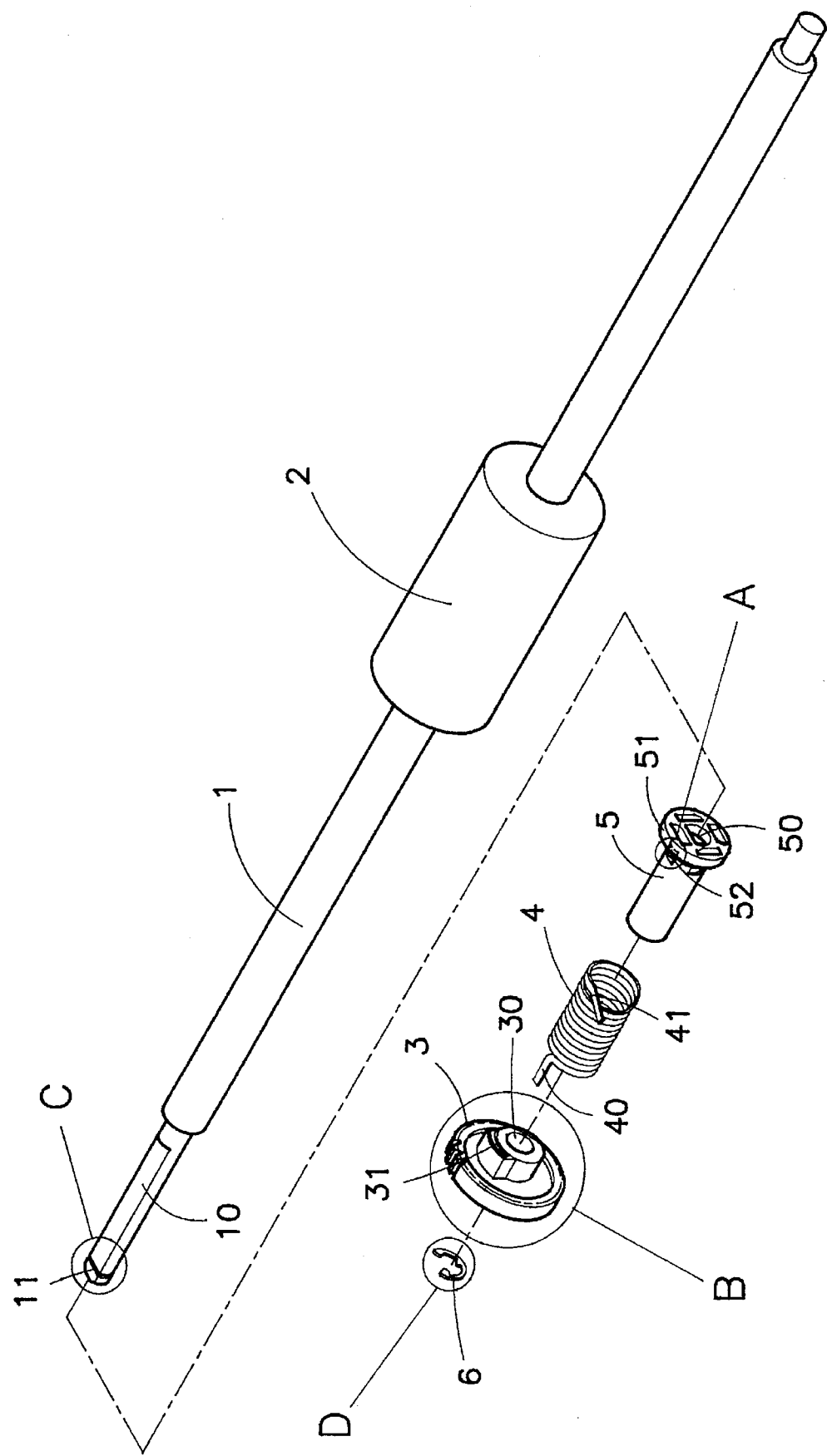
FIG. 2 is an exploded view of a feed roll assembly according to the present invention.
Figure 2A:
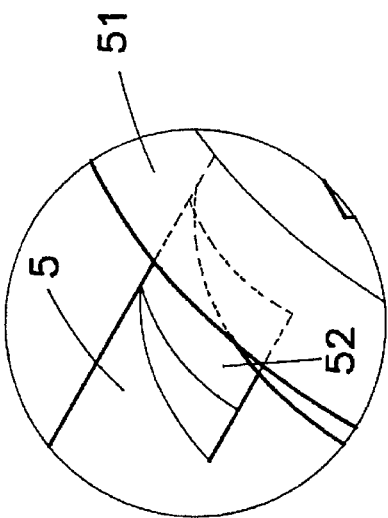
FIG. 2A is an enlarged view of a part of the coupling wheel shown in FIG. 2.
Figure 2B:
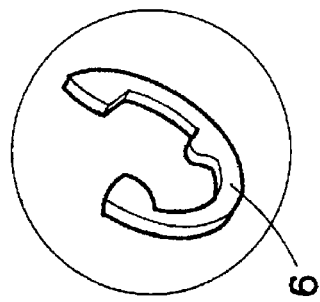
FIG. 2B is an enlarged view of the transmission gear shown in FIG. 2.
Figure 2C:
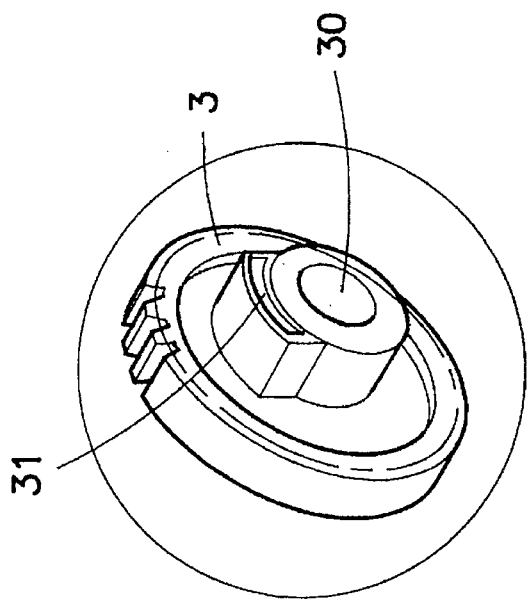
FIG. 2C is an enlarged view of the end of the non-circular extension rod of the axle shown in FIG. 2.
Figure 2D:
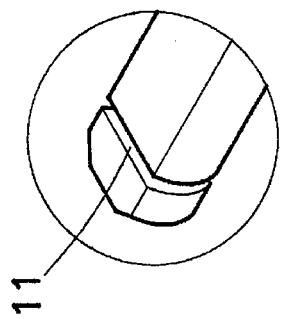
FIG. 2D is an enlarged view of the clamp shown in FIG. 2.
Figure 3:
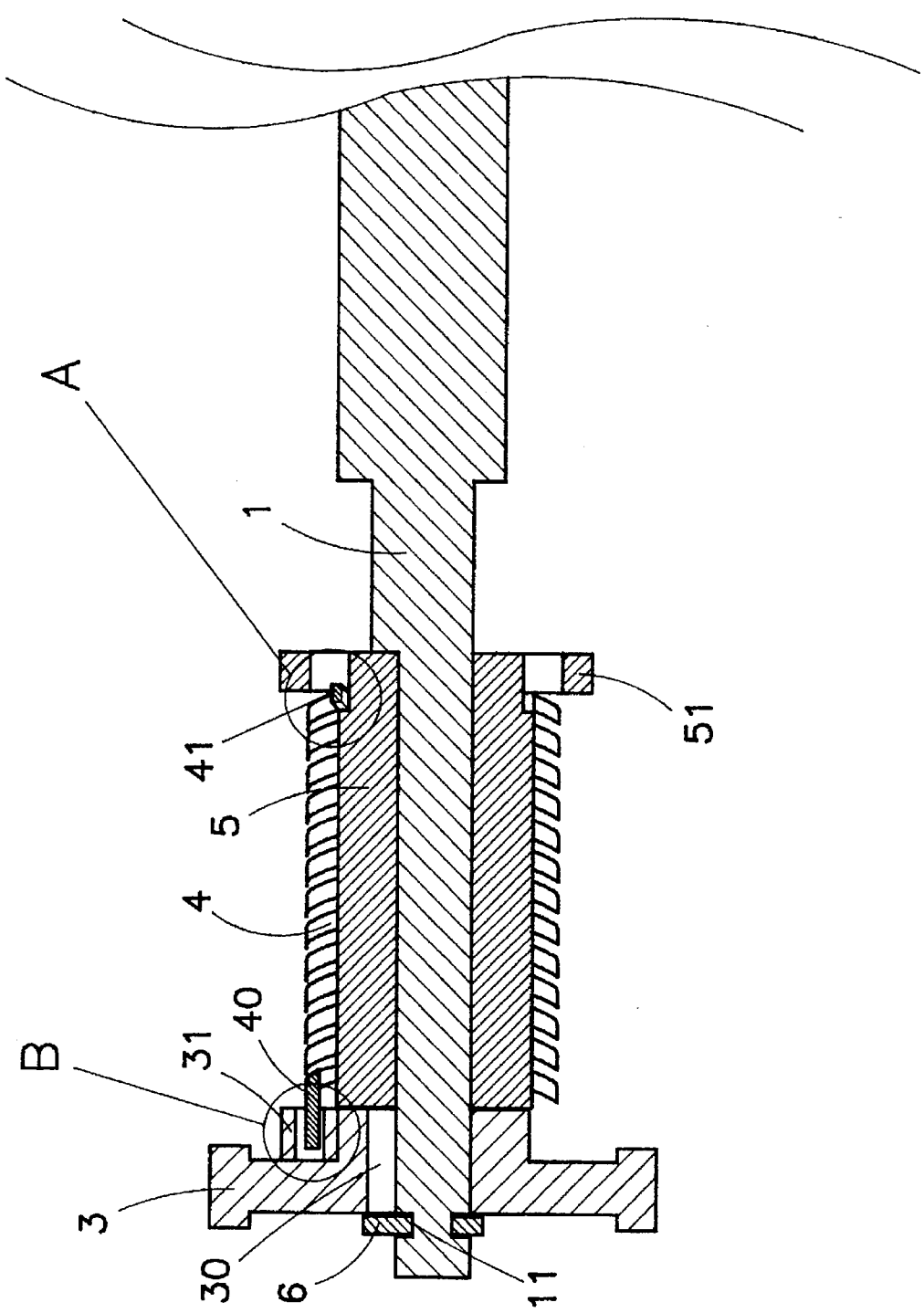
FIG. 3 is a sectional assembly view of the present invention showing the transmission gear, the coupling wheel, and the spring mounted on the noncircular extension rod of the axle.
Figure 3B:
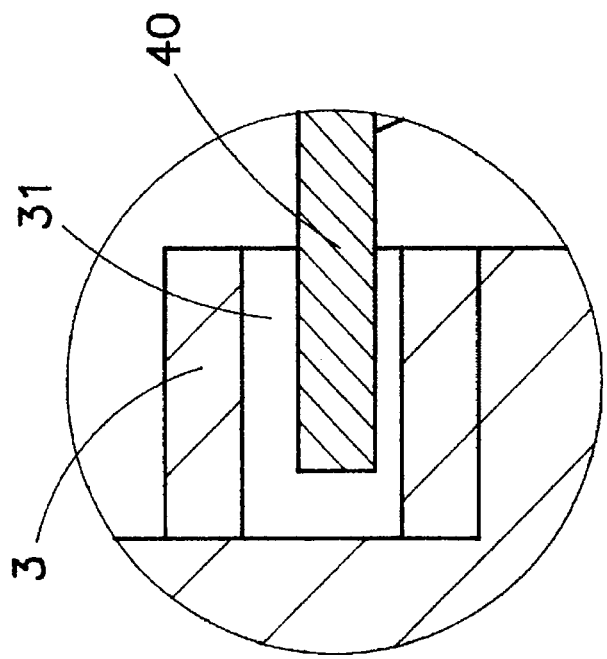
FIG. 3B is an enlarged view in section of a part of FIG. 3, showing the rear end of the spring disposed in the arched groove of the transmission gear.
Figure 3A:
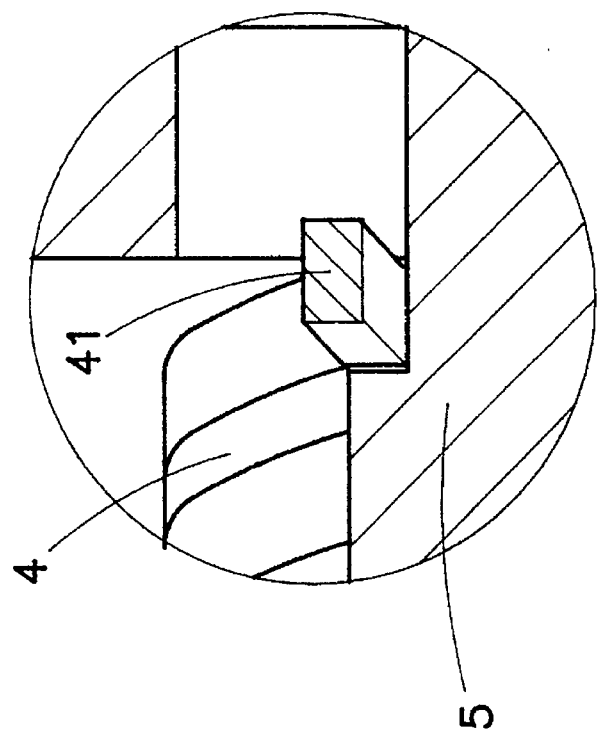
FIG. 3A is an enlarged view in section of a part of FIG. 3, showing the front end of the spring disposed in one wedge-like groove of the coupling wheel.

Referring to FIGS. 1, 2, and 3, a sheet feed roll assembly in accordance with the present invention is generally comprised of an axle 1, a roll 2, a transmission gear 3, a spring 4, and a coupling wheel 5. The roll 2 is fixedly mounted around the axle 1 in the middle. The axle 1 has a non-circular extension rod 10 at one end and a mounting groove 11 around the periphery of the non-circular extension rod 10. The transmission gear 3 is revolvably mounted around the non-circular extension rod 10 of the axle 1 at one end, having a center through hole 30 which receives the noncircular extension rod 10 of the axle 1, an arched groove 31 around the center through hole 30. The spring 4 is mounted around the non-circular extension rod 10 of the axle 1 and sleeved onto the coupling wheel 5, having a rear end 40 longitudinally extending backwards and a front end 41 radially extending sideways. The coupling wheel 5 is sleeved onto the non-circular extension rod 10 of the axle 1 within the spring 4, having a noncircular center through hole 50 which fits the noncircular cross section of the non-circular extension rod 10 of the axle 1, an outward flange 51 raised around the periphery at one end, and a plurality of wedge-like grooves 52 spaced around the periphery adjacent to the outward flange 51. When the transmission gear 3, the spring, 4 and the coupling wheel 5 are respectively mounted around the non-circular extension rod lo of the axle 1, a clamp 6 is fastened to the mounting groove 11 to secure the members in place. When installed, the rear end 40 of the spring 4 is moved in the arched groove 31 of the transmission gear 3, and the front end 41 thereof is disposed in the wedge-like grooves 52 of the coupling wheel 5.

Figure 4:
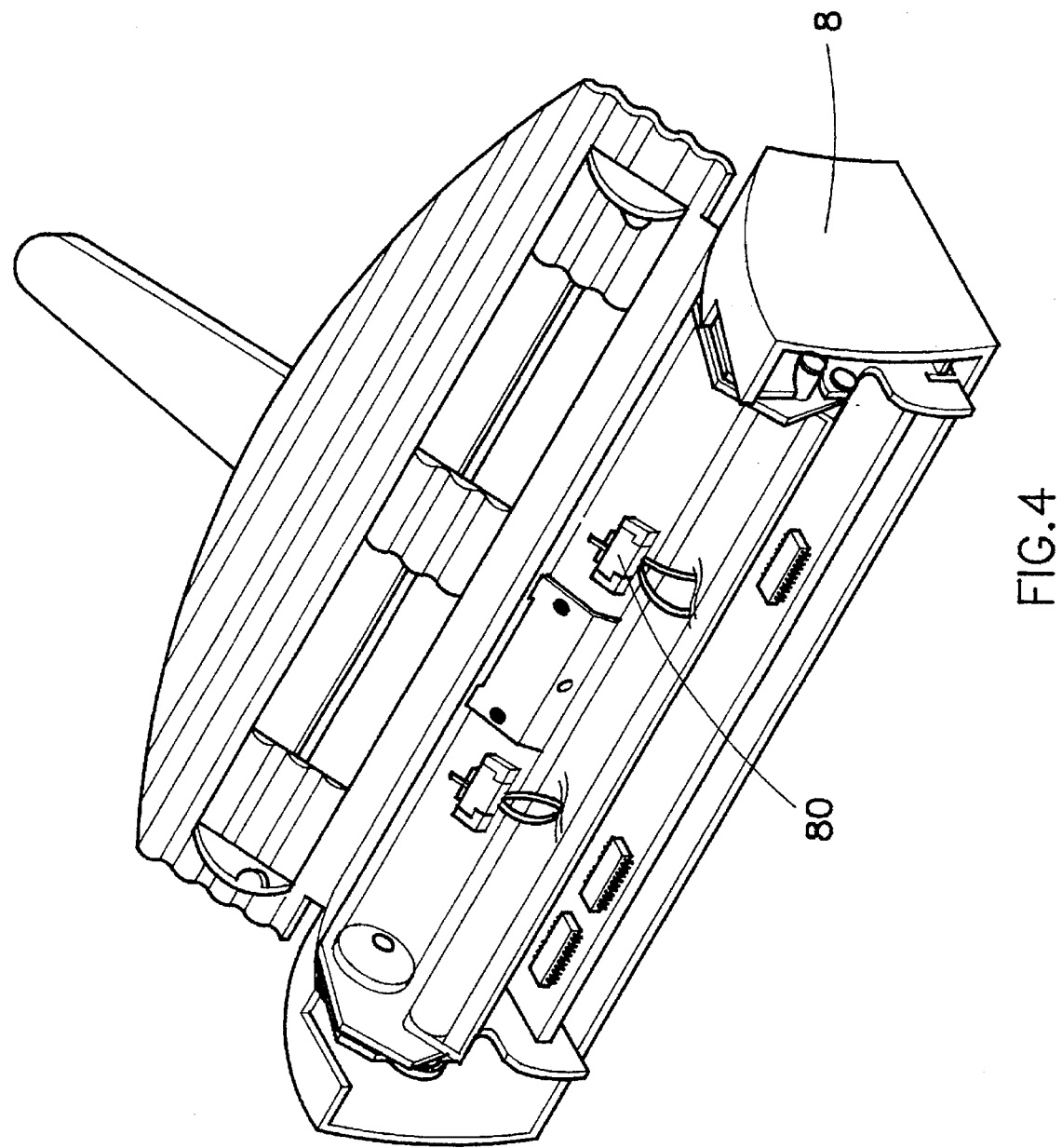
FIG. 4 shows the feed roll assembly of the present invention installed in a scanner.
Figure 5:
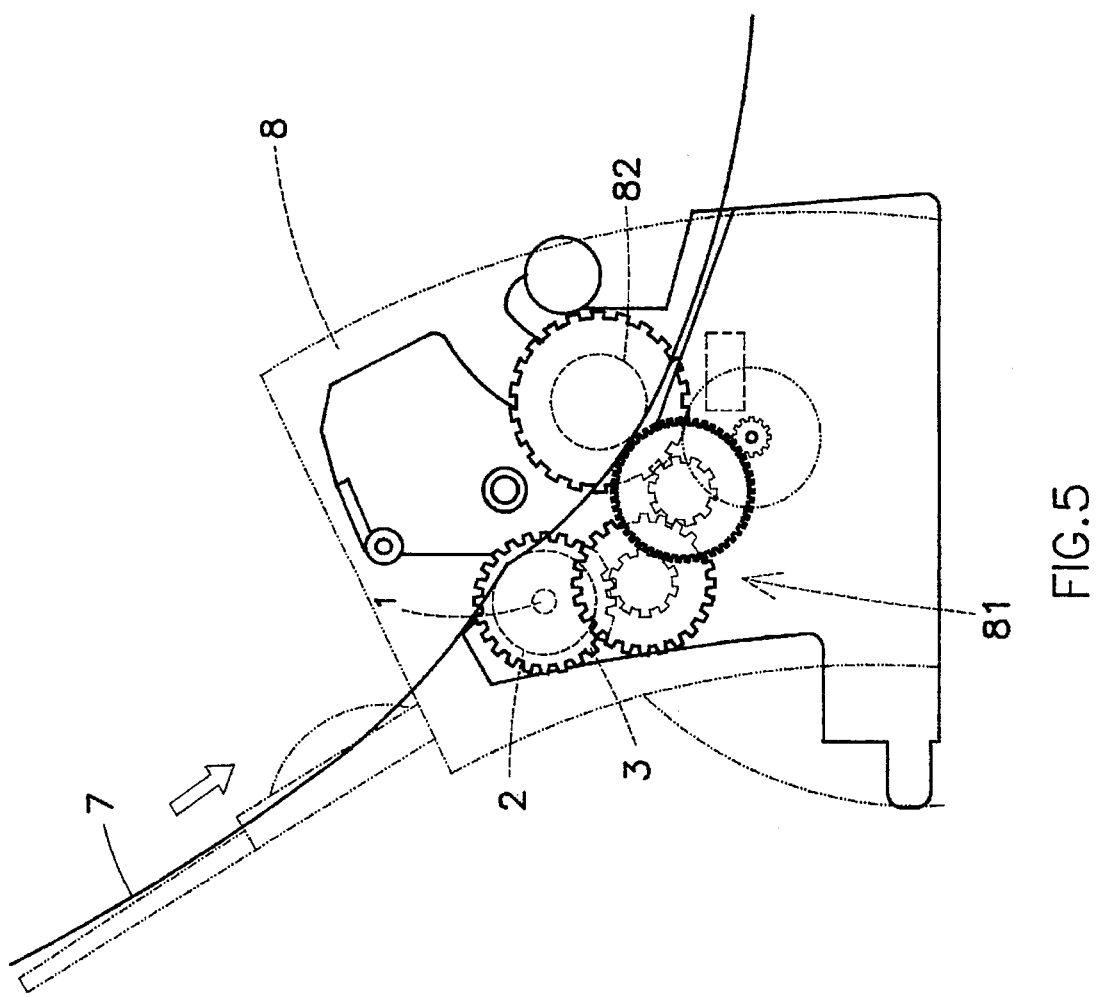
FIG. 5 is a side plain view showing the feed roll assembly of the present invention installed in the scanner and operated.

Referring to FIGS. 4 and 5, when a sheet of paper 7 is inserted into the scanner 8 to touch the switch 80, the motor drive of the machine (not shown) is driven to a reduction gear 81, causing it to turn the transmission gear 3 forwards. When the transmission gear 3 is rotated forwards, the rear end 40 of the spring 4 is forced by one end of the arched groove 31 of the transmission gear 3 to compress the spring 4, causing the front end 41 of the spring 4 to be forced into one wedge-like groove 52 of the coupling wheel 5, and therefore the coupling wheel and the spring 4 are coupled together, permitting the axle 1 to be turned by the transmission gear 3 through the spring 4 and the coupling wheel 5. When the axle 1 is rotated forwards, the roll 2 is rotated with the axle 1 to deliver the sheet of paper 7 forwardly to the transmission roll, referenced by 82. When the sheet of paper 7 is carried forwards by the transmission roll 82, the roll 2 is pulled by the transmission roll 82 through the sheet of paper 7 to turn the axle 1 and the coupling wheel 5 synchronously, causing the wedge-like grooves 52 of the coupling wheel 5 to be disengaged from the front end 41 of the spring 4, and therefore the spring 4 is freely turned around the coupling wheel 5 without causing any reaction force.

While only one embodiment of the present invention has been shown and described, it will be understood that various modifications and changes could be made without departing from the spirit and scope of the invention disclosed. For example, any suitable stop means may be used and installed to replace the clamp 6 in stopping the transmission gear 3 in place.

We claim:

1. A feed roll assembly comprising an axle installed in a machine and having a non-circular extension rod at one end, a roll fixedly mounted around said axle in the middle and turned by it to deliver inserted sheets of paper one after another, a coupling wheel coupled to the non-circular extension rod of said axle and turned with it, said coupling wheel having an outward flange at one end and a plurality of wedge-like grooves spaced around the periphery adjacent to said outward flange, a transmission gear revolvably mounted around the non-circular extension rod of said axle and having a circular center through hole which receives the non-circular extension rod of said axle and an arched groove around said circular center through hole, and a spring movably mounted around said coupling wheel and stopped between said transmission gear and the outward flange of said coupling Wheel, said spring having a rear end moved in the arched groove of said transmission gear and a front end moved relative to the wedge-like groove of said coupling wheel, wherein the front end of said spring is forced into one wedge-like groove of said coupling wheel when said transmission gear is rotated forwards, thereby causing said spring to be compressed and coupled to said coupling wheel so that said coupling wheel is driven by said transmission gear to turn said axle.

2. The feed roll assembly of claim 1 further comprising a clamp fastened to a mounting groove around one end of the non-circular extension rod of said axle to hold said transmission gear in place.

* * * * *